US012568443B2

(12) United States Patent
Patel et al.

(10) Patent No.: US 12,568,443 B2
(45) Date of Patent: Mar. 3, 2026

(54) NETWORK OPERATOR CONTROLLED POWER UPDATE FOR PHYSICAL RESOURCE BLOCKS

(71) Applicant: T-MOBILE INNOVATIONS LLC, Overland Park, KS (US)

(72) Inventors: Nishant Patel, Irvine, CA (US); Kanwar-Preet Singh Jolly, Chantilly, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 353 days.

(21) Appl. No.: 18/295,660

(22) Filed: Apr. 4, 2023

(65) Prior Publication Data

US 2024/0340805 A1     Oct. 10, 2024

(51) Int. Cl.
| | |
|---|---|
| *H04W 52/16* | (2009.01) |
| *H04W 4/02* | (2018.01) |
| *H04W 16/02* | (2009.01) |
| *H04W 52/24* | (2009.01) |
| *H04W 52/42* | (2009.01) |
| *H04W 72/0453* | (2023.01) |

(52) U.S. Cl.
CPC ........... *H04W 52/16* (2013.01); *H04W 4/025* (2013.01); *H04W 16/02* (2013.01); *H04W 52/243* (2013.01); *H04W 52/42* (2013.01); *H04W 72/0453* (2013.01)

(58) Field of Classification Search
CPC ... H04W 52/16; H04W 52/243; H04W 52/42; H04W 4/025; H04W 16/02; H04W 72/0453
See application file for complete search history.

(56) References Cited

U.S. PATENT DOCUMENTS

| | | | |
|---|---|---|---|
| 11,197,300 B1 * | 12/2021 | O'Neill | H04W 72/541 |
| 2009/0279478 A1 * | 11/2009 | Nagaraj | H04B 7/0417 |
| | | | 370/328 |
| 2010/0113059 A1 * | 5/2010 | Morimoto | H04W 16/02 |
| | | | 455/452.2 |
| 2010/0290406 A1 * | 11/2010 | Miki | H04L 1/0013 |
| | | | 370/329 |
| 2010/0309864 A1 * | 12/2010 | Tamaki | H04W 52/42 |
| | | | 370/329 |
| 2017/0188363 A1 * | 6/2017 | Ellinikos | H04W 72/542 |
| 2019/0306861 A1 * | 10/2019 | Li | H04W 72/0453 |
| 2020/0274677 A1 * | 8/2020 | Xing | H04L 5/0039 |
| 2024/0129902 A1 * | 4/2024 | Abdelghaffar | H04L 5/0094 |

* cited by examiner

*Primary Examiner* — Ariel A Balaoing
(74) *Attorney, Agent, or Firm* — SHOOK, HARDY & BACON L.L.P.

(57) ABSTRACT

Methods and systems for network operator controlled power update per PRB for new radio (NR) are provided. A method begins with determining that at least one frequency block controlled by a first network operator is adjacent or co-channel with at least one frequency block controlled by a second network operator. Next, it is determined that a second frequency block controlled by the first network operator is adjacent or co-channel with the at least one frequency block controlled by the first network operator. The power level assigned to the first network operator's frequency block is updated to reduce interference. To prevent interference, the power level of the second frequency block controlled by the first network operator uses a lower power level. This lower power level may be assigned on a resource block basis, such as PRBs and RBGs.

20 Claims, 6 Drawing Sheets

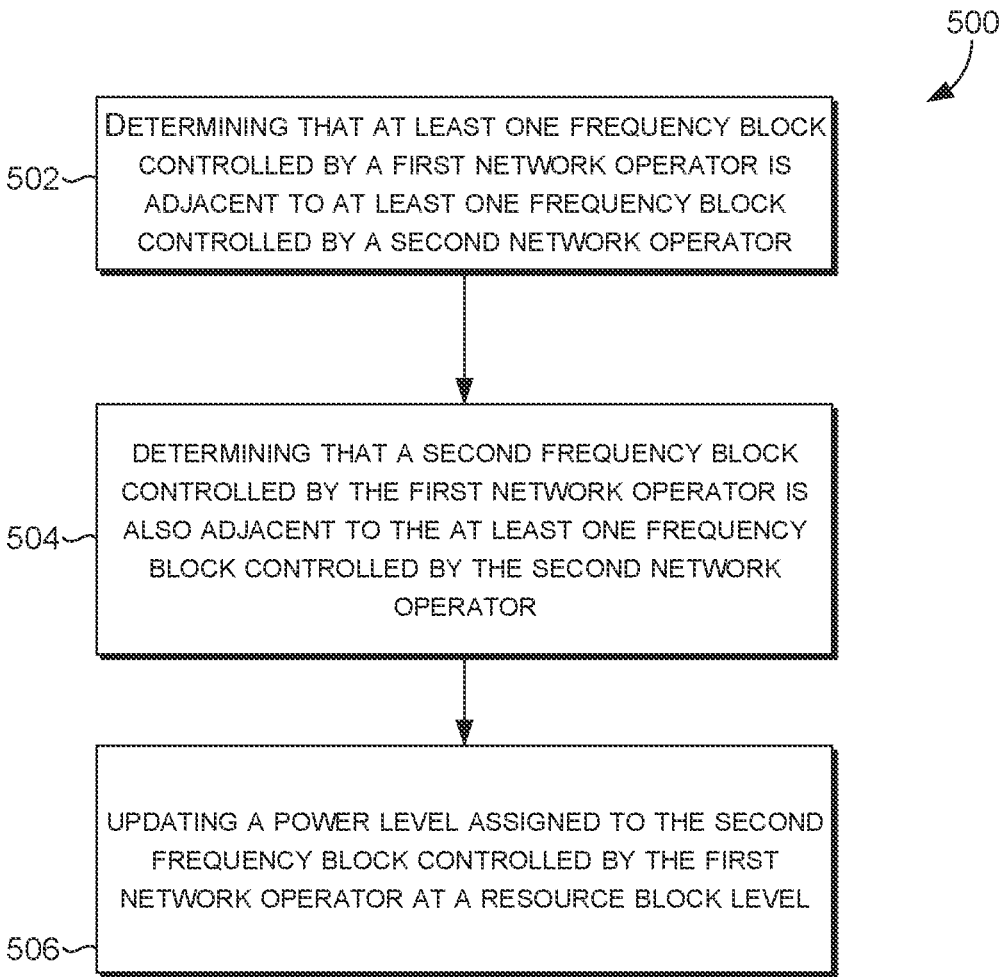

500

502 — DETERMINING THAT AT LEAST ONE FREQUENCY BLOCK CONTROLLED BY A FIRST NETWORK OPERATOR IS ADJACENT TO AT LEAST ONE FREQUENCY BLOCK CONTROLLED BY A SECOND NETWORK OPERATOR

504 — DETERMINING THAT A SECOND FREQUENCY BLOCK CONTROLLED BY THE FIRST NETWORK OPERATOR IS ALSO ADJACENT TO THE AT LEAST ONE FREQUENCY BLOCK CONTROLLED BY THE SECOND NETWORK OPERATOR

506 — UPDATING A POWER LEVEL ASSIGNED TO THE SECOND FREQUENCY BLOCK CONTROLLED BY THE FIRST NETWORK OPERATOR AT A RESOURCE BLOCK LEVEL

FIG. 5

NETWORK OPERATOR CONTROLLED POWER UPDATE FOR PHYSICAL RESOURCE BLOCKS

BACKGROUND

In both long term evolution (LTE) and new radio (NR) or 5G networks, physical resource blocks (PRBs) are assigned by a scheduler to a user equipment (UE) for each transmission. The PRBs are assigned by the scheduler based on the radio frequency (RF) conditions. Operators today don't have contiguous spectrum blocks in all geographic areas of their networks, causing buffer zones to be created around spectrum blocks. The buffer zones prevent network operators from using all of the spectrum allotted to each network operator as the buffer zones are needed to avoid interference in areas where other network operators own the spectrum.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems are provided for network operator controlled power updates for PRBs, used with, for example, new radio (NR). A first network operator has first and second frequency blocks. A second network operator has at least one frequency block that is adjacent or co-channel with at least one of the frequency blocks controlled by the first network operator. A method begins with determining that at least one frequency block that is controlled by the first network operator is adjacent to at least one frequency block controlled by the second network operator. In some cases, the frequency block controlled by the first network operator is placed on a base station that covers portions of a first geographic area and a second geographic area.

Based on the determination, it is then determined if a second frequency block controlled by the first network operator is also adjacent or co-channel to at least one frequency block controlled by the second network operator. These adjacent or co-channel frequency blocks may interfere with one another if operating at a normal power level. To prevent this interference, the power level of the second frequency block controlled by the first network operator uses a lower power level. This lower power level may be assigned on a resource block basis, such as PRBs and RBGs.

BRIEF DESCRIPTION OF THE SEVERAL VIEWS OF THE DRAWINGS

Implementations of the present disclosure are described in detail below with reference to the attached drawing figures, wherein:

FIG. 5 is a flow diagram of an exemplary method for network operator controlled power update per PRBs in an exemplary network environment, in which aspects of the present disclosure may be employed, in accordance with aspects herein.

DETAILED DESCRIPTION

Figure 1:
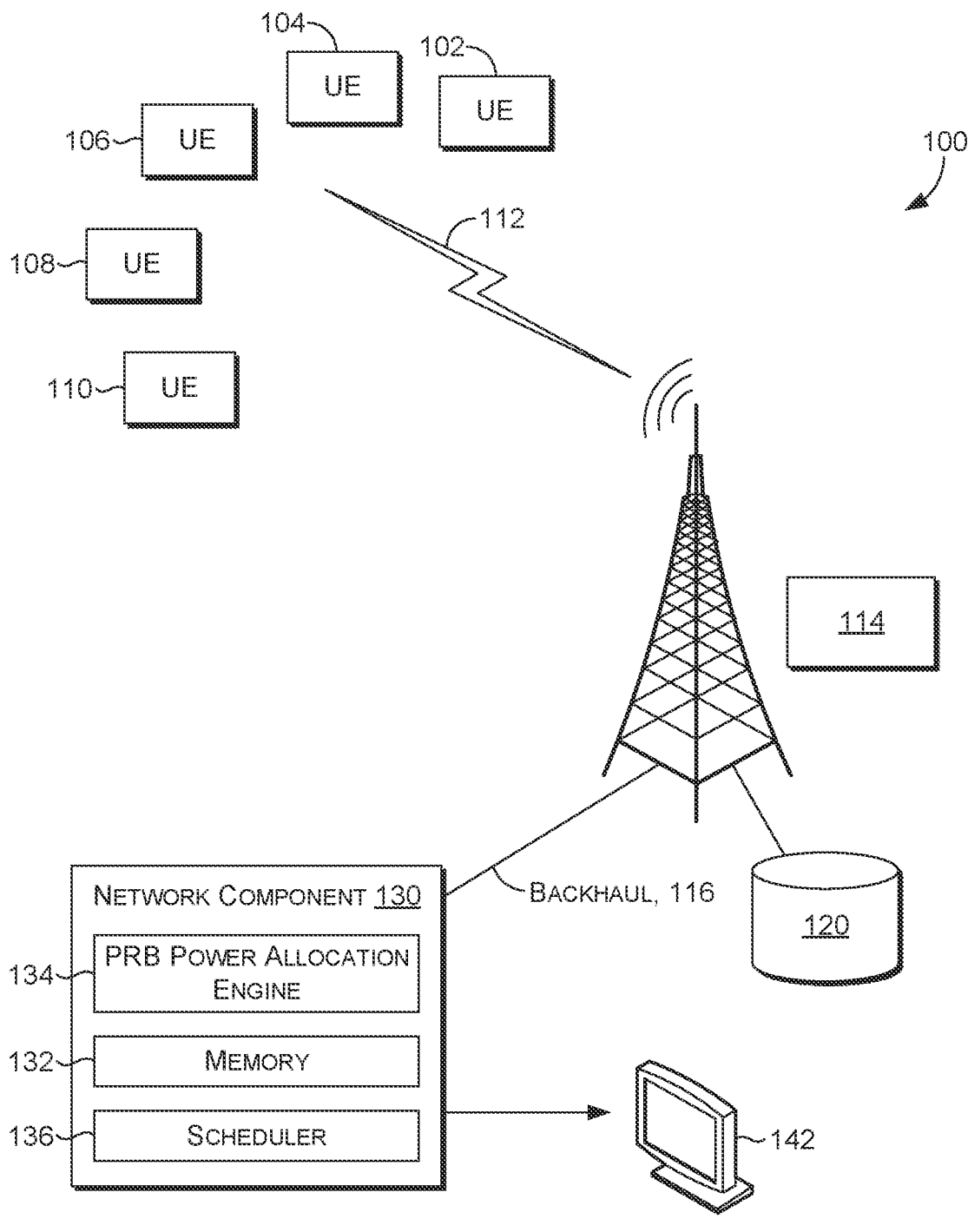
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel PHICH Physical Hybrid ARQ Indicator Channel
PRB Physical Resource Block
PUCCH Physical Uplink Control Channel
PUSCH Physical Uplink Shared Channel
RAM Random Access Memory
RBG Resource Block Group
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable
  with UE)

Further, various technical terms are used throughout this description. An illustrative resource that fleshes out various aspects of these terms can be found in Newton's Telecom Dictionary, 32d Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. A base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In accordance with a first aspect of the present disclosure a method of network operator controlled power updates per PRBs for NR is provided. The method begins with determining that at least one frequency block controlled by a first network operator is adjacent or co-channel with at least one frequency block controlled by a second network operator. Based on the determining that adjacency, determining that a second frequency block controlled by the first network operator is also adjacent or co-channel with the at least one frequency block controlled by the second network operator. The power level assigned to the second frequency block controlled by the first network operator is then updated, based on a resource block level.

A second aspect of the present disclosure provides a method of network operator controlled power updates per PRBs for NR is provided. The method begins with a UE communicating with a base station at a first power level using at least one frequency block controlled by a first network operator wherein a coverage area associated with the base station overlaps a first geographical area and a second geographical area. The device updates to a second power level when instructed by the first network operator, wherein the updating to the second power level allocates power on a resource block level.

Another aspect of the present disclosure is directed to a non-transitory computer storage media storing computer-useable instructions that, when used by one or more processors, cause the processors to determine that at least one frequency block controlled by a first network operator is adjacent to at least one frequency block controlled by a second network operator. The processors then determine that a second frequency block controlled by the first network operator is also adjacent to the at least one frequency block controlled by the second network operator. The processors then update a power level assigned to the second frequency block on a resource block level.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes UEs 102, 104, 106, 108, and 110, base station 114 (which may be a cell site or the like), and one or more communication channels 112. The communication channels 112 can communicate over frequency bands assigned to the carrier. In network environment 100, UEs may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, an extended reality device, and any combination of these delineated devices, or any other device (such as the computing device (600) that communicates via wireless communications with the base station 114 in order to interact with a public or private network.

Figure 6:
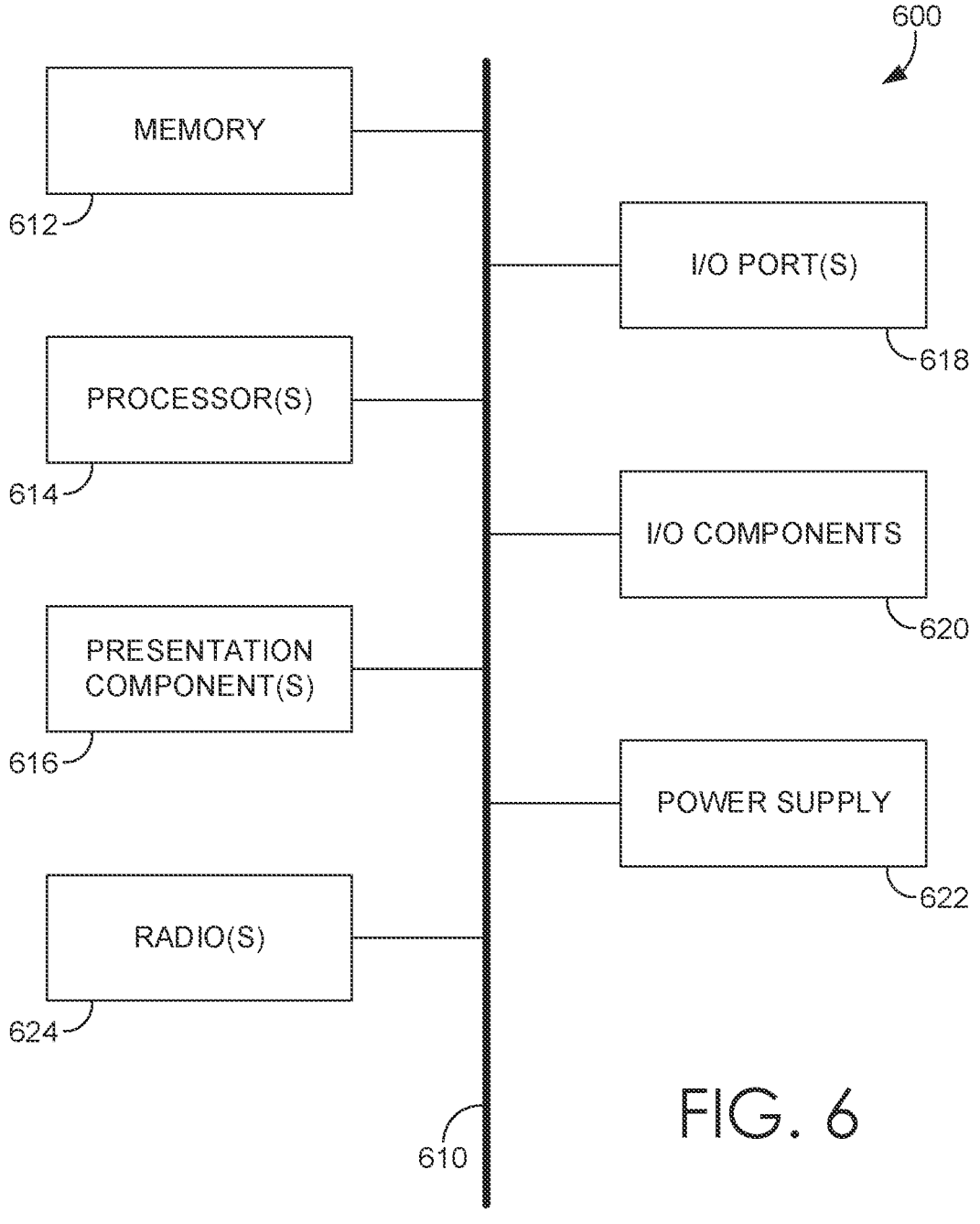
FIG. 6 depicts an exemplary computing device suitable for use in implementations of the present disclosure, in accordance with aspects herein.

In some aspects, each of the UEs 102, 104, 106, 108, and 110 may correspond to computing device 600 in FIG. 6. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual power metrics used by each of the UEs, the power metrics can be automatically communicated by each of the UEs 102, 104, 106, 108, and 110 to the base station 114. The power metrics for each UE may indicate interference and the need for a network operator controlled power update per PRB. Base station 114 may store the data communicated by the UEs 102, 104, 106, 108, and 110 at a network database 120. Alternatively, the base station 114 may automatically retrieve the power metrics from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new power metrics every time, or within a predetermined time threshold so as to keep the power metrics stored in the network database 120 current. For example, the data may be received at or retrieved by the base station 114 every 10 minutes and the data stored at the network database 120 may be kept current for 30 days, which means that power metrics older than 30 days would be replaced by newer power metrics at 10 minute intervals. As described above, the power metrics collected by the UEs 102, 104, 106, 108, and 110 can include, for example, service state status, the respective UE's current geographic location, a current time, a strength of the wireless signal, available networks, and the like.

The network component 130 comprises a memory 132, a PRB power allocation engine 134, and a scheduler 136. All determinations, calculations, and data further generated by the PRB power allocation engine 134, and scheduler 136 may be stored at the memory 132 and also at the data store 140. Although the network component 130 is shown as a single component comprising the memory 132, PRB power allocation engine 134, and the scheduler 136, it is also contemplated that each of the memory 132, PRB power allocation engine 134, and scheduler 136 may reside at different locations, be its own separate entity, and the like, within the home network carrier system.

The network component 130 is configured to retrieve signal information, UE device information, slot configuration, latency information, including quality of service (QOS) information, and metrics from the base station 114 or one of the UEs 102, 104, 106, 108, and 110. The information may also include RF signal quality information, such as signal to interference and noise (SINR) ratio. In addition, PRB power allocation may also be included in the information. UE device information can include a device identifier, data usage, and power allocation information. The scheduler 136 can monitor the activity of the UEs 102, 104, 106, 108, and 110 and is aware of the PRBs used by each of the UEs. The scheduler 136 can assign PRB allocations to the UEs 102, 104, 106, 108, and 110 for each transmission according to the RF conditions and may do so in conjunction with the PRB power allocation engine 134.

PRBs are resource blocks that belong to a bandwidth segment. Numbering starts at the bottom of the bandwidth and each bandwidth part has its own set of PRBs. PRBs are distributed in sets by the scheduler 136 and may be assigned to base stations or sectors of base stations. One sector of a base station or eNB may assign PRB set 1 to a UE and may assign PRB set 2 to a different UE.

Figure 2:
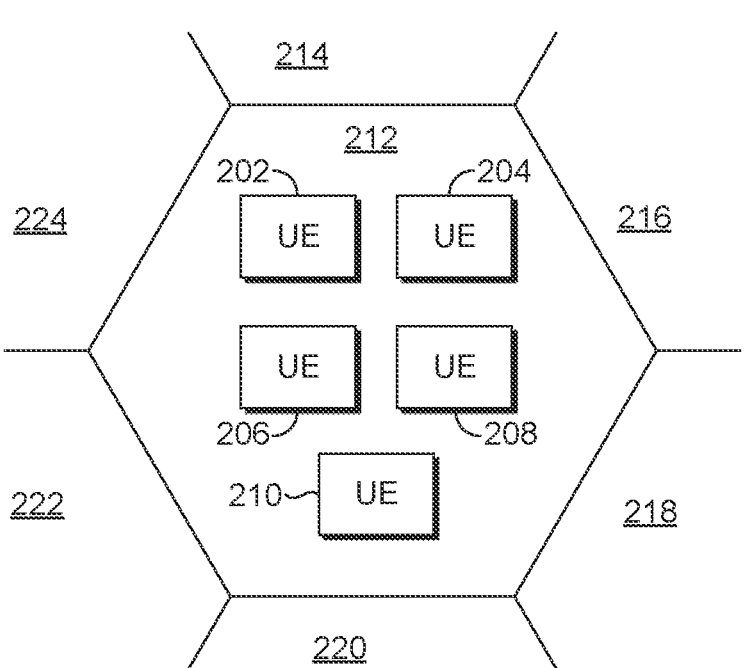
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

Figure 3:
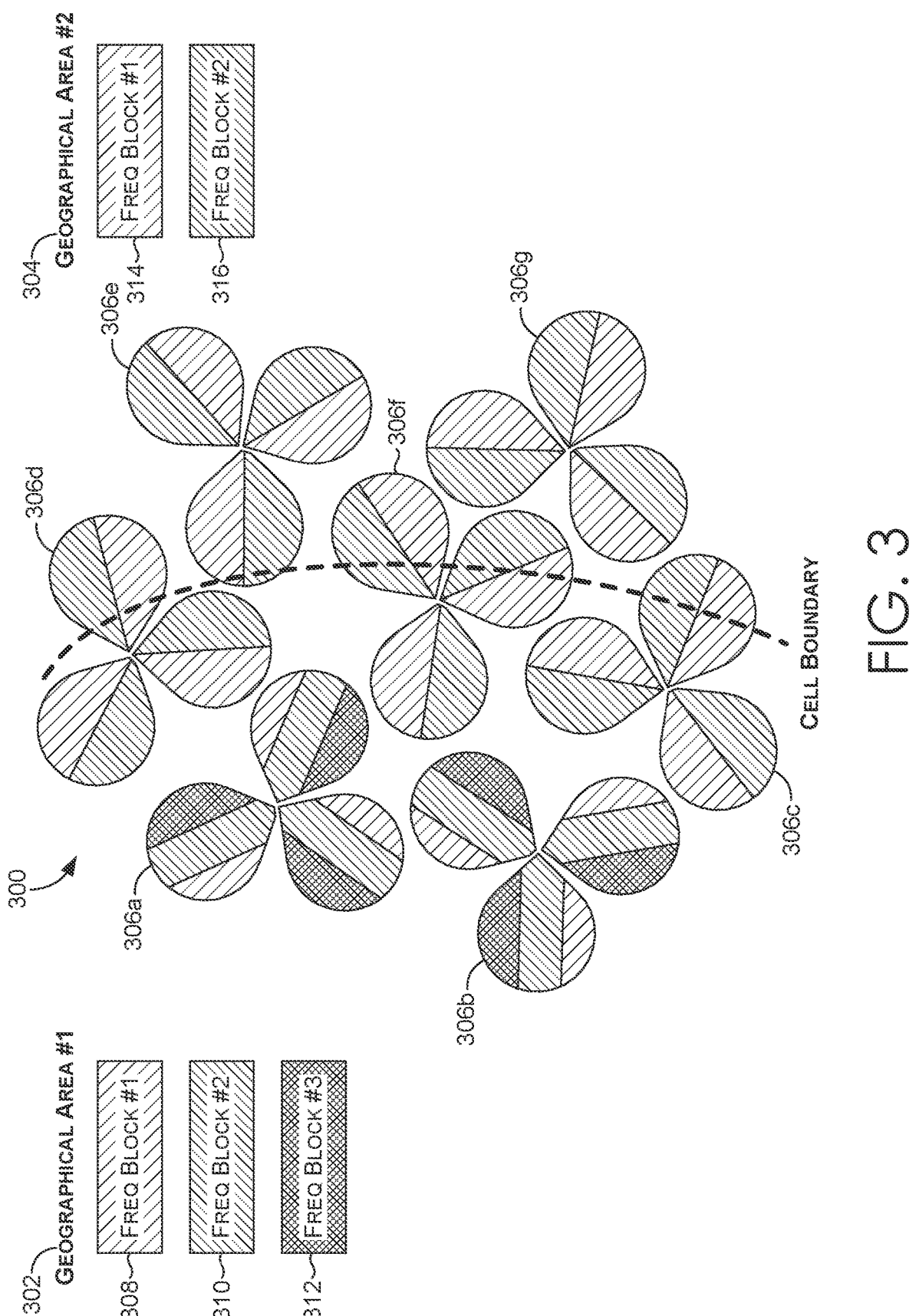
FIG. 3 depicts a diagram of power allocation in a network on a per MHz basis, in which implementations of the present disclosure may be employed, in accordance with aspects herein.

FIG. 3 depicts a diagram of power allocation in a network on a per MHz basis, in which implementations of the present disclosure may be employed. A network 300 includes two geographical areas, first geographical area 302 and second geographical area 304. Each geographical area includes multiple base stations 306*a-g* which may be controlled by multiple network operators. First geographical area 302 includes three frequency blocks, first frequency block 308, second frequency block 310, and third frequency block 312. In second geographical area 304 are found two frequency blocks, first frequency block 314 and second frequency block 316.

A first network operator controls three frequency blocks in geographic area 302, frequency block 1 308, frequency block 2 310, and frequency block 3 312. The first network operator does not control frequency block 3 312 in geographic area 304. Frequency block 3 312 in geographic area 304 may be controlled by a second network operator. As the first network operator's deployment of frequencies moves closer to the geographic area boundary between geographic area 302 and geographic area 304, the first network operator is forced to sacrifice use of frequency block 3 312. This sacrifice reduces the capacity of the first network operator.

Not only is the first network operator's capacity reduced near the boundary between geographic area 302 and geographic area 304, new channels using frequency block 1 314 and frequency block 2 316 are introduced into geographical area 302. The first network operator may provide consistent channels across geographic area 302 by reducing the power allotted to frequency band 3 312 in deployments near the boundary of geographic area 302. The power allotted to frequency band 1 308 and frequency band 2 310 are not changed as users of those frequency bands traverse the geographical area boundaries.

In the network 300 power allocation within a channel is performed on a per MHz basis. To give one example, 200 W is allocated to the 100 MHz spectrum. Power allocation may be performed at a minimal level of MHz, such that 2 W are allocated per MHz. Each of the 273 PRBs will be allocated the same amount of power, 7.3 mW per PRB.

Figure 4:
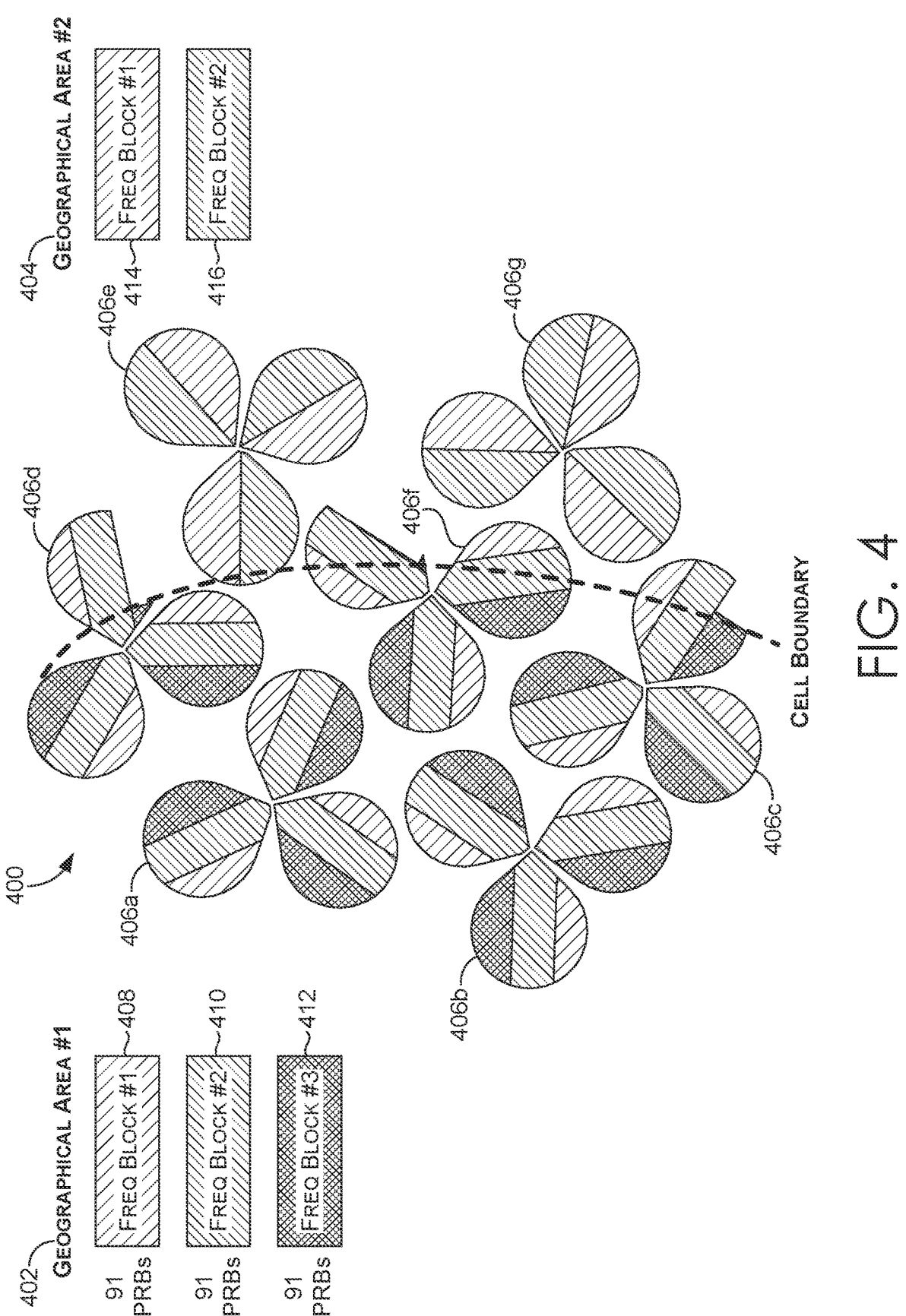
FIG. 4 depicts a diagram of power allocation in a network on operator controlled power update on a per PRBs basis, in which implementations of the present disclosure may be employed, in accordance with aspects herein.

FIG. 4 depicts a diagram of power allocation in a network on operator controlled power update on a per PRBs basis, in which implementations of the present disclosure may be employed. A network 400 includes two geographical areas, first geographical area 402 and second geographical area 304. Each geographical area includes multiple base stations which may be controlled by multiple network operators. First geographical area 402 uses base stations 406*a*, 406*b*, 406c and includes three frequency blocks, first frequency block 408, second frequency block 410, and third frequency block 412. Some base stations straddle the geographical area boundary, such as 406c, 406d, 406e, and 406f. Base station 406g is located in the second geographical area 404 and covers second geographical area 404 only. In second geographical area 404 are found two frequency blocks, first frequency block 414 and second frequency block 416.

A first network operator controls three frequency blocks in a first geographical area 402, first frequency block 1 408, second frequency block 2 410, and third frequency block 3 412. A second network operator controls first frequency block 1 414 and second frequency block 2 416 in geographic area 304. Third frequency block 3 412 may be assigned to the first network operator and may be used along the cell boundary in base stations 406c, 406d, 406e, and 406f if the power is allocated on a PRB or RBG basis. First geographical area 302 uses base stations 406a, 406b, and 406c. Some base stations straddle the cell boundary, such as 406c, 406d, 406e, and 406f. While a base station may straddle a cell boundary, most base stations are located within the cells they cover. Coverage from a base station may extend beyond the area where the base station is physically located. Base station 406g is located in the second geographical area 404 only. Base stations 406a-406g are dispersed along a cell boundary. Some base stations, such as 406c, 406d, 406e, 406f, and 406g use two frequencies, first frequency associated with first frequency block 1 414 and second frequency associated with second frequency block 2 416. Power allocations on frequency block 1 408 and frequency block 2 410 are not changed, however, power allocation on frequency band 3 412 is reduced near the boundary of geographical area 402. Third frequency associated with third frequency block 312 can now be used in base stations 406c, 406d, 406e, 406f, and 406g because power allocation is performed on a PRB or RBG level.

The PRB or RBG power allocation may start at either edge of the spectrum and may begin in the middle of the spectrum block. As an example, if a base station, such as base station 406f, is transmitting on the third frequency block 412. The PRBs or RBGs allocated to the third frequency block 412 transmit at a lower power than the other PRBs or RBGs for that NR carrier. 182 PRBs may transmit at 7.3 mW per PRB and 91 PRBs that are a part of third frequency block 412 may be configured to transmit at a lower power per PRB to transmit in second geographical area 404. Reducing the power used in the third frequency block 412 allows for maximizing spectrum use of the frequencies assigned to a network operator. In addition, reducing the power used in the third frequency block 412 simplifies channel planning and provides consistency. Allocating power to the PRBs or RBGs as described herein may be used wherever a network operator's spectrum is not contiguous.

FIG. 5 is a flow diagram of an exemplary method of network operator controlled power updates in a network. The method 500 begins in step 502 with determining that at least one frequency block controlled by a first network operator is adjacent to at least one frequency block controlled by a second network operator. The method continues in step 504 with determining that a second frequency block controlled by the first network operator is also adjacent to the at least one frequency block controlled by the second network operator. The method then continues in step 506 with updating a power level assigned to the second frequency block on a resource block basis.

The updating of the power level on a resource block basis may use a PRB level to allocate power. As an alternative, the resource block level may be a RBG level. When the updating of the power level occurs due to the contiguous frequency blocks, to avoid interference between the frequencies, the power level allocated for each resource block may be lowered. This power level of the PRBs used for transmitting may thus have a lower transmit power level than other PRBs for a NR carrier.

The frequency blocks controlled by the first network operator may be used in a first geographical area while the frequency blocks controlled by the second network area may be used in a second geographical area. A cell used by the first network operator may overlap the first and second geographical area. The power level may also be adjusted by configuring the RBGs allocated to the second frequency block to use a lower transmit power than other RBGs for the NR carrier.

FIG. 6 depicts an exemplary computing device suitable for use in implementations of the present disclosure, in accordance with aspects herein. With continued reference to FIG. 6, computing device 600 includes bus 602 that directly or indirectly couples the following devices: memory 612, one or more processors 614, one or more presentation components 616, input/output (I/O) ports 618, I/O components 620, radio(s) 624, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 present data indications to a person or other device. Exemplary one or more presentation components 616 include a display device, speaker, printing component, vibrating component, etc. I/O ports 618 allow computing device 600 to be logically coupled to other devices including I/O components 620, some of which may be built into computing device 600. Illustrative I/O components 620 include a microphone, joystick, game pad, satellite dish, scanner, printer, wireless device, etc.

The radio 624 represents one or more radios that facilitate communication with a wireless telecommunications network. While a single radio 624 is shown in FIG. 6, it is contemplated that there may be more than one radio 624 coupled to the bus 610. In aspects, the radio 624 communicates with the wireless telecommunications network. It is expressly conceived that a computing device with more than one radio 624 could facilitate communication with the wireless telecommunications network via a first radio and a second radio. Illustrative wireless telecommunications technologies include CDMA, GPRS, TDMA, GSM, and the like. The radio 624 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of network operator controlled power updates in a network, the method comprising:

determining that a first frequency block controlled by a first network operator is adjacent to at least one frequency block controlled by a second network operator;

determining that a second frequency block controlled by the first network operator is also adjacent to the at least one frequency block controlled by the second network operator; and updating a power level assigned to the first frequency block and the second frequency block controlled by the first network operator at a resource block level, wherein the updating is based on network information obtained from the first network operator and further based on adjacency between the frequency blocks controlled by the first operator and the frequency block controlled by the second network operator.

2. The method of claim 1, wherein the resource block level is a physical resource block (PRB) level.

3. The method of claim 1, wherein the resource block level is a resource block group (RBG) level.

4. The method of claim 1, wherein updating the power level assigned to the second frequency block controlled by the first network operator lowers the transmit power allocated to the second frequency block controlled by the first network operator.

5. The method of claim 2, wherein at least one PRB allocated to the second frequency block controlled by the first network operator is allocated a lower power level than at least one other PRB for a new radio (NR) carrier.

6. The method of claim 1, wherein the at least one frequency block controlled by the first network operator is used in a first geographical area and the at least one frequency block controlled by the second network operator is used in a second geographical area.

7. The method of claim 6, wherein a cell used by the first network operator overlaps the first geographical area and the second geographical area.

8. The method of claim 3, wherein at least one RBG allocated to the second frequency block controlled by the first network operator is allocated a lower power level than at least one other RBG for a new radio (NR) carrier.

9. A method of network operator controlled power updates in a network, the method comprising:

transmitting to a user equipment (UE) at a first power level using at least one frequency block controlled by a first network operator, wherein a coverage area associated with the base station overlaps a first geographical area and a second geographical area; and updating the first power level to a second power level when instructed by the first network operator, wherein the updating allocates power on a resource block level based on adjacency of the at least one frequency block controlled by the first network operator to at least one frequency block controlled by the second network operator.

10. The method of claim 9, wherein the resource block level is a physical resource block (PRB) level.

11. The method of claim 9, wherein the resource block level is a resource block group (RBG) level.

12. The method of claim 9, wherein the second power level is lower than the first power level.

13. A non-transitory computer storage media storing computer-useable instructions that, when used by one or more processors, cause the processors to:

determine that a first frequency block controlled by a first network operator is adjacent to at least one frequency block controlled by a second network operator;

determine that a second frequency block controlled by the first network operator is also adjacent to the at least one frequency block controlled by the second network operator; and update a power level assigned to the first frequency block and the second frequency block controlled by the first network operator at a resource block level, wherein the updated power level is based on network information obtained from the first network operator and on a frequency adjacency between the frequency blocks controlled by the first network operator and the at least one frequency block controlled by the second network operator.

14. The non-transitory computer storage media of claim 13, wherein the resource block level is a physical resource block (PRB) level.

15. The non-transitory computer storage media of claim 13, wherein the resource block level is a resource block group (RBG) level.

16. The non-transitory computer storage media of claim 13, wherein updating the power level assigned to the first frequency block and the second frequency block controlled by the first network operator lowers the transmit power allocated to the second frequency block controlled by the first network operator.

17. The non-transitory computer storage media of claim 14, wherein at least one PRB allocated to the second frequency block controlled by the first network operator is allocated a lower power level than at least one other PRB for a new radio (NR) carrier.

18. The non-transitory computer storage media of claim 13, wherein the at least one frequency block controlled by the first network operator is used in a first geographical area, and the at least one frequency block controlled by the second network operator is used in a second geographical area.

19. The non-transitory computer storage media of claim 18, wherein a cell used by the first network operator overlaps the first geographical area and the second geographical area.

20. The non-transitory computer storage media of claim 15, wherein at least one RBG allocated to the second frequency block controlled by the first network operator is allocated a lower power level than at least one other RBG for a new radio (NR) carrier.

* * * * *